United States Patent
Matsumoto et al.

(10) Patent No.: US 6,396,774 B1
(45) Date of Patent: May 28, 2002

(54) INFORMATION REPRODUCING DEVICE, INFORMATION RECORDING/REPRODUCING HEAD, AND INFORMATION REPRODUCING METHOD UTILIZING MONO-MAGNETIC DOMAIN STRUCTURE

(75) Inventors: Koji Matsumoto; Tohru Fujimaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/410,563

(22) Filed: Oct. 1, 1999

(30) Foreign Application Priority Data

Oct. 28, 1998 (JP) .............................. 10-307570

(51) Int. Cl.⁷ ........................... G11B 11/00; G11B 5/127
(52) U.S. Cl. ..................... 369/13.02; 360/110
(58) Field of Search ................... 369/13, 112.01, 369/112.27, 112.02, 13.02, 13.05, 13.06, 13.24, 126; 360/110, 125

(56) References Cited

U.S. PATENT DOCUMENTS 6,044,041 A * 3/2000 Ishizaki et al. ............... 369/13

FOREIGN PATENT DOCUMENTS

| JP | 471244 | 1/1972 |
| JP | 5637839 | 4/1981 |
| JP | 61214260 | 9/1986 |
| JP | 61214261 | 9/1986 |
| JP | 6275955 | 4/1987 |
| JP | 6325422 | 11/1994 |

OTHER PUBLICATIONS

"Signal Read–out Characteristic of Floating Magnetic Head Using Magnetic Garnet"; T. Terada et al.; The Institute of Electronics, Information and Communication Engineers, Technical Report of IEICE; MR97–84, CPM97–176, p. 1–p. 7.

"Nikkei Electronics", No. 586, written by Ishida & Watanabe; p. 169–181; Jul. 19, 1993.

* cited by examiner

Primary Examiner—Paul W. Huber
(74) Attorney, Agent, or Firm—Greer, Burns & Crain, Ltd.

(57) ABSTRACT

An information reproducing head which uses a magnetic-substance chip having mono-magnetic domain structure as an information reproducing device so that information, which has been recorded on an information recording medium with a high density, can be copied in an enlarged manner and reproduced with high precision.

17 Claims, 15 Drawing Sheets

INFORMATION REPRODUCING DEVICE, INFORMATION RECORDING/ REPRODUCING HEAD, AND INFORMATION REPRODUCING METHOD UTILIZING MONO-MAGNETIC DOMAIN STRUCTURE

BACKGROUND OF THE INVENTION

The present invention relates to an information reproducing device which copies information magnetically recorded on an information recording medium, and an information reproducing method for reproducing information copied on the information reproducing device by utilizing the magneto-optical effect.

Recently, the recording density of magnetic recording and optical recording has been greatly increased and the recording and reproducing techniques have been developed; consequently, there have been ever-increasing demands for higher-density information recording. Here, various means for recording information on a recording medium using a magnetic film and for reproducing the information have been known. For example, in the case of a magnetic disk used as a recording medium, after information has been magnetically recorded, leakage flux from a recorded mark is detected by using a ring head or a thin-film head. Moreover, in the case of a magneto-optical disk used as a recording medium, after information has been magnetically recorded (in this case, particularly referred to as thermo-magnetic recording), a light beam which has been narrowed down to approximately its diffraction limit is emitted to the medium, and a change in the magneto-optical effect occurring in the magnetic film at this time is detected.

Moreover, another method has been proposed in which after information has been recorded on a recording medium using a magnetic film, an information reproducing device having a magnetic substance is brought close to the recording medium so as to copy the magnetization direction of the information, and a light beam which has been narrowed down to approximately its diffraction limit is emitted to the information reproducing device so that a change in the magneto-optical effect occurring in the magnetic substance is detected. In this method, the information recorded on the recording medium is copied on the information reproducing device, and then reproduced.

FIG. 1 is an explanatory drawing that shows a reproducing method using a conventional information reproducing device. This information reproducing device has been reported in "Signal Read-out Characteristic of Floating Magnetic Head Using Magnetic Garnet", THE INSTITUTE OF ELECTRONICS, INFORMATION AND COMMUNICATION ENGINEERS, TECHNICAL REPORT OF IEICE, MR97-84, CPM97-176 (1998-03), p.1–p.7. In the Figure, the encircled portion shows an enlarged view. A reproducing head is placed on a face of a magnetic recording medium 14 having recording bits 15 in which information is magnetically recorded. The reproducing head is a floating magnetic head in which a slider section 10 is supported by a suspension 3. The slider section 10 is constituted as follows: A magnetic garnet film 16 is formed on a GGG (gadolinium, gallium, garnet) substrate 18 through crystal growth, thereon is formed a reflection film 17 made of titanium and a protective film 19 made of $SiO_2$. The slider section 10 faces the magnetic recording medium 14 on the protective film 19 side.

In this reproducing head, upon reproducing, a leakage magnetic flux from the magnetic recording medium 14 is copied onto the magnetic garnet film 16 with the result that respective magnetization directions maintained by recording bits 15, 15 . . . are formed on the magnetic garnet film 16. A laser beam is emitted onto the magnetic garnet film 16 so that copied information is reproduced by detecting a change in the magneto-optical effect. Since the magnetic garnet exhibits a great magneto-optical effect, a greater reproducing signal can be obtained by reproducing information from the magnetic garnet film 16. However, the problem with this reproducing head is that in the case of recording wavelengths of not more than 2 μm, the amplitude of the reproducing signal drops greatly, failing to reproducing information recorded with a high density.

Moreover, Japanese Patent Application Laid-Open No. 62-75955 (1987) has suggested a magneto-optical recording/reproducing head using a garnet film. This magneto-optical recording/reproducing head has recording and reproducing functions, is provided with a head having the garnet film that exhibits in-plane magnetization, and copies or induces information from a magnetic recording medium. Then, by magneto-optically reproducing the magnetization direction of the garnet film, it is possible to obtain a reproduced signal with a high level. The information reproducing device using such a garnet film has been proposed by various other references (Japanese Patent Application Laid-Open No. 47-1244(1972), Japanese Patent Application Laid-Open No. 56-37839(1981), Japanese Patent Application Laid-Open No. 61-214260(1986), Japanese Patent Application Laid-Open No. 61-214261(1986), Japanese Patent Application Laid-Open No. 6-325422 (1994), etc.).

In the case when the information reproducing device which uses the garnet having a high magneto-optical effect is used for magneto-optical reproduction, a reproduced signal having a high level is obtained; however, as described earlier, this device fails to reproduce information recorded with a high density. Moreover, none of the above-mentioned patent applications specifically disclose the dimension and the magnetic characteristics of the garnet film, and the dimension of the head, etc., making it difficult to put this device into practical use.

BRIEF SUMMARY OF THE INVENTION

The present invention has been devised to solve the above-mentioned problems, and one objective of the present invention is to provide an information reproducing device which can copy and reproduce information of an information recording medium that has been recorded with a high density by using a magnetic-substance chip having single-magnetic domain structure. Moreover, another objective of the present invention is to provide an information reproducing head, an information recording/reproducing head and an information reproducing method, which are allowed to reproduce information of an information recording medium that has been recorded with a high density by using such an information reproducing device.

An information reproducing device of the present invention faces to an information recording film so as to copy a magnetic flux to be reproduced, characterized by including a magnetic-substance chip having mono-magnetic domain structure.

The magnetic substance forms stripe magnetic domains, and has a specific magnetic domain width in a demagnetization state in accordance with composition of the magnetic substance. In the present invention, the dimension of the magnetic-substance chip in the magnetic-domain forming direction is set smaller than the above-mentioned specific magnetic domain width; therefore, the magnetic-substance chip has the mono-magnetic domain structure. Therefore, in the case when the width dimension of the magnetic-substance chip is greater than a recording mark formed on an information recording film, the magnetic flux of the recording mark formed on the information recording film is copied on the magnetic-substance chip in an enlarged manner during reproduction. Here, since the magnetic-substance chip forms only one magnetic domain over the entire area, it can detect, with high precision, a change in the magneto-optical effect at the time of an inversion in the magnetization direction. In this case, although the minimum recording mark formed on the information recording film has a smaller dimension than the magnetic-substance chip, an area which is determined by the temperature distribution of the information recording film and the inclination of the magnetic-substance chip to the information recording film during reproduction is copied onto the magnetic-substance chip.

The information reproducing device of the present invention is characterized in that the magnetic-substance chip is being formed into a predetermined dimension by etching a magnetic substance that has been grown on a substrate.

Therefore, since the crystal growth of the magnetic-substance is made from a parent material that serves as the substrate, the magnetic-substance chip has an accurate magnetic characteristic in composition. Moreover, a plurality of magnetic-substance chips may be simultaneously form on the parent material by etching, and then, the parent material may be cut into pieces; thus, it is possible to easily manufacture a number of information reproducing devices.

The information reproducing device of the present invention is characterized in that the magnetic-substance chip includes a receiving face for receiving a magnetic flux from the information recording film and an irradiation face for being irradiated with a light beam for reproducing the magnetic flux that has been copied. Moreover, the irradiation face has a larger area than the receiving face of the magnetic flux.

Therefore, the dimension of the receiving face of the magnetic flux is set closer to the dimension of the minimum recording mark formed on the information recording film, and since the dimension of the irradiation face for reproducing the copied magnetic flux is large, the magnetic flux is accurately copied so that it is possible to obtain a reproducing signal with high level.

The information reproducing device of the present invention is characterized in that a magnetization permeable film for allowing the magnetic flux to pass and to be copied onto the magnetic-substance chip is formed on the receiving face of the magnetic-substance chip.

In the present invention, the magnetization permeable film is a magnetic film having a high permeability. The magnetization permeable film is formed at a part of the magnetic-substance chip and faces at the information recording film. Therefore, the recording mark of the information recording medium that are closest to the opposing magnetization permeable film are copied. Consequently, even if the recording marks on the information recording film are fine, the magnetic flux is copied with high precision.

The information reproducing device of the present invention is characterized in that the magnetic-substance chip is made of a magnetic oxide having magnetic garnet structure that contains a rear earth metal, a transition metal and oxygen ions.

Therefore, since the magnetic oxide having the magnetic garnet structure exhibits a great magneto-optical effect, the copied magnetic flux is reproduced with a greater signal level.

The information reproducing device of the present invention is characterized in that the magnetic-substance chip has an irradiation face that is irradiated with a light beam for reproducing a copied magnetic flux, and further comprises a reflection film, on the side of apposing the irradiation face, for reflecting the light beam.

Therefore, the reflection film reflects the light beam with which the magnetic-substance chip is irradiated so that the light beam transmitting toward the information recording film can be reduced, thereby making it possible to increase the quantity of light received for obtaining a reproducing signal.

The information reproducing device in accordance with the present invention is characterized in that the magnetic-substance chip is a soft magnetic film having a perpendicular easy axis of magnetization.

Therefore, since the magnetic-substance chip has the perpendicular easy axis of magnetization, the irradiation direction of the light beam to the information reproducing device is determined in accordance with the magnetization direction of the magnetic-substance chip to the information recording film, the magnetic-substance chip facing to the information recording film. Consequently, it is possible to obtain an accurate reproducing characteristic.

The information reproducing head in accordance with the present invention is characterized by comprising the above-mentioned information reproducing device and a slider that has the information reproducing device attached thereto and is placed opposite to an information recording medium having the information recording film.

Since the slider is placed opposite to the medium, the magnetic-substance chip is facing closer to the information recording film so that information is copied and reproduced. With respect to the slider, the parent material for the magnetic-substance chip of the information reproducing device may be used as it is, or the parent material and the magnetic-substance chip may be attached to a slider section made of, for example, a synthetic resin.

The information reproducing head in accordance with the present invention is characterized by comprising the above-mentioned information reproducing device and an optical waveguide having a tip to which the information reproducing device is attached, with the tip being placed opposite to an information recording medium having the information recording film.

Since the tip of the optical waveguide, such as an optical fiber, is placed opposite to the medium, the magnetic-substance chip is facing closer to the information recording film so that information is copied and reproduced.

The information reproducing head in accordance with the present invention is characterized in that the magnetic-substance chip is arranged with its easy axis of magnetization being aligned substantially in parallel with the thickness direction of the information recording film.

Therefore, in the case when the information recording film is a perpendicular magnetization film or an in-plane magnetization film, a leakage magnetic flux from the information recording film is allowed to form a closed magnetic path, with the result that the perpendicular component of the magnetic flux is copied onto the magnetic-substance chip, and reproduced.

The information reproducing head in accordance with the present invention is characterized in that the magnetic-substance chip is arranged with the direction of its easy axis of magnetization being aligned crossing to the thickness direction of the information recording film.

Therefore, in the case when the information recording film is a perpendicular magnetization film or an in-plane magnetization film, a leakage magnetic flux from the information recording film is allowed to form a closed magnetic path, with the result that the in-plane component of the magnetic flux is copied onto the magnetic-substance chip, and reproduced.

The information recording/reproducing head in accordance with the present invention, which is a recording/ reproducing head that has the above-mentioned information reproducing device and that records and reproduces information by relatively moving an information recording medium having the information recording film, is characterized by comprising the above-mentioned information reproducing device, a slider that is placed so as to face the information recording medium to which the information reproducing device is attached, and a magnetic head section for applying a magnetic field to the information recording medium, the magnetic head section being placed on the rear side in the shifting direction of the information reproducing device.

Upon recording information on the information recording film, the information is magnetically recorded by applying a magnetic field onto the information recording film by the magnetic head section. Alternatively, the information reproducing device is irradiated with a light beam so as to heat the information recording film and a magnetic field is applied to the information recording film by the magnetic head section, so that the information is magneto-optically recorded.

The information recording/reproducing head in accordance with the present invention, which is a recording/ reproducing head that has the above-mentioned information reproducing device and that records and reproduces information by relatively moving an information recording medium having the information recording film, is characterized by comprising the above-mentioned information reproducing device, an optical waveguide having a tip to which the information reproducing device is attached, with the tip being placed opposite to the information recording medium, and a coil section that is wound around the tip of the optical waveguide.

Upon recording information on the information recording film, the information is magnetically recorded by applying a magnetic field to the information recording film from the coil section. Alternatively, by applying a light beam onto the information reproducing device attached to the tip of the optical waveguide such as an optical fiber so as to heat the information recording film, while a magnetic field is applied to the information recording film from the coil section, the information is magneto-optically recorded.

The information reproducing method in accordance with the present invention, which is an information reproducing method for reproducing information from an information recording medium having an information recording film, is characterized by comprising the steps of: placing a magnetic-substance chip having mono-magnetic domain structure so as to face the information recording film; copying a magnetic flux of a first area of the information recording film to the entire area of the magnetic-substance chip; moving the information recording medium with respect to the magnetic-substance chip, relatively; copying a magnetic flux in a second area adjacent to the first area of the information recording film to the entire area of the magnetic-substance chip; and irradiating the magnetic-substance chip with a light beam, so that a change in the magneto-optical effect of the magnetic-substance chip is detected during the information recording medium relatively moves.

Therefore, since the magnetic flux of the first area of the information recording film is copied onto the entire area of the magnetic-substance chip having mono-magnetic domain structure, a short recording mark that has been recorded on the information recording film with a high density is copied in an enlarged manner. Moreover, since the magnetic-substance chip forms only one magnetic domain with its entire area, the reproducing process is carried out by detecting a magnetization inversion within the entire area of the magnetic-substance chip so that a reproducing signal with a high level is obtained with an improved reproducing characteristic.

The above and further objects and features of the invention will more fully be apparent from the following detailed description with accompanying drawings.

DETAILED DESCRIPTION OF THE INVENTION

Referring to Figures, the following description will discuss embodiments of the present invention in detail.

Embodiment 1

Figure 1:
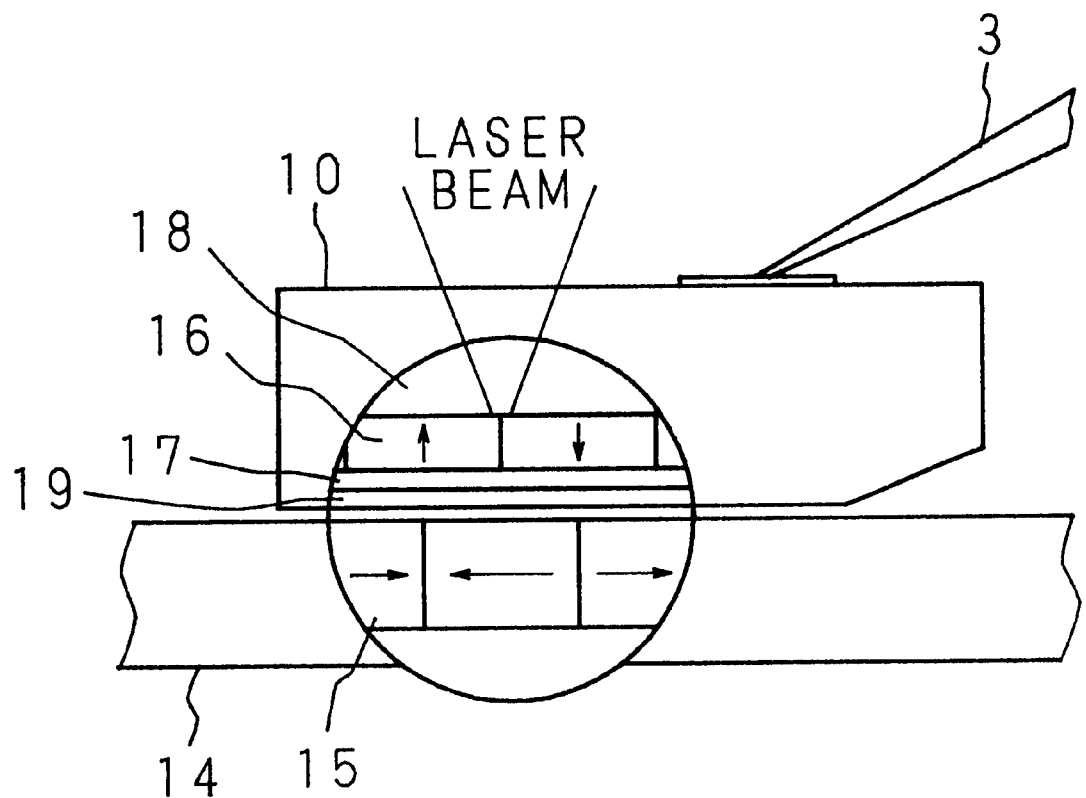
FIG. 1 is an explanatory drawing that shows a reproducing method in which a conventional information reproducing device is used.
Figure 2:
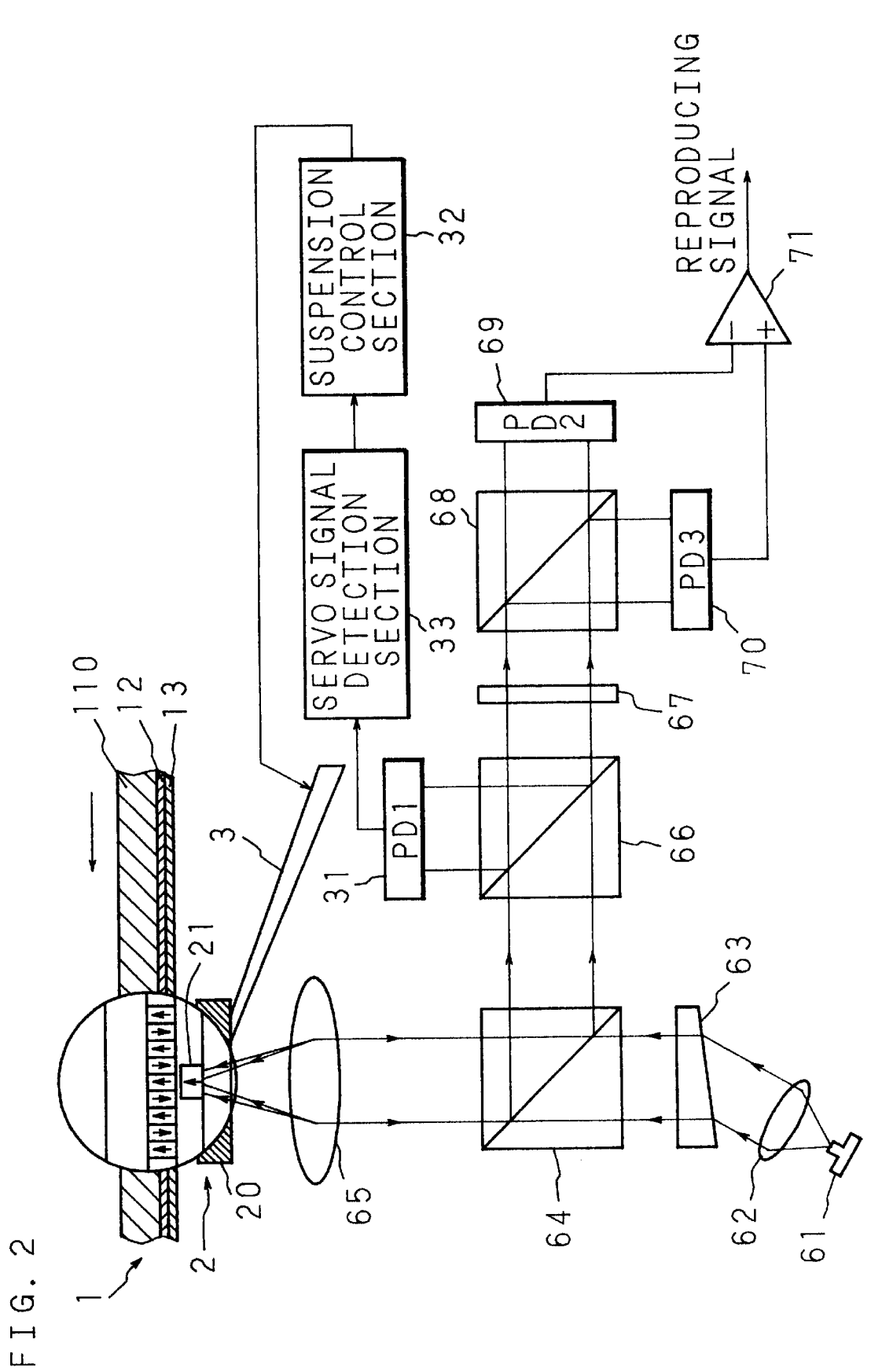
FIG. 2 is a block diagram that shows the construction of a reproducing apparatus in accordance with the present invention.

FIG. 2 is a block diagram that shows the construction of a reproducing apparatus in accordance with the present invention. The reproducing apparatus is constituted by a reproducing head 2 having a reproducing chip (magnetic-substance chip) 21 which features the present invention, a suspension 3 for supporting the reproducing head 2, and an optical system which emits a laser beam to the reproducing chip 21 and receives its reflected light so as to give a signal to a reproducing signal detection system and a servo signal detection system. The reproducing head 2 has a construction in which the reproducing chip 21 made of a magnetic oxide, for example, $TbBi_2Fe_4GaO_{12}$, is placed substantially in the center of the upper surface of a GGG substrate 20. In the reproducing head 2 the reproducing chip 21 disposed in facing a magneto-optical disk 1, and the GGG substrate 20 as a slider is shifted to a predetermined position above the magneto-optical disk 1 by the shift of the suspension 3. Here, the upper surface of the reproducing chip is coated with a protective layer (not shown) formed by, for example, a transparent lubricating layer so as to protect it from possible damages at the time of sliding on the magneto-optical disk 1.

As illustrated in FIG. 2, a laser beam, released from a laser light source 61, is allowed to form a round parallel light beam while passing through a collimator lens 62 and an intrinsic correction prism 63, passes through an objective lens 65 via a first beam splitter 64, and is converged onto a base surface (bottom surface) of the reproducing chip 21. The laser beam reflected by the reproducing chip 21 again passes through the objective lens 65, is reflected by the first beam splitter 64, and made incident on a second beam splitter 66. The laser beam is split into transmitted light and reflected light by the second beam splitter 66, and the transmitted light is rotated in its polarizing direction by a ½ wave-length plate 67 so as to detect a reproducing signal, and then divided into respective polarized components by a third beam splitter 68 so as to be received by photodiodes PD2 and PD3 respectively. Electric signals from the photodiodes PD2 and PD3 are inputted to a differential amplifier 71 so that a reproducing signal is obtained.

The reflected light from the second beam splitter 66 is received by the photodiode PD1, and an electric signal from the photodiode PD1 is inputted to a servo signal detection section 32 so that a tracking control signal and a focus control signal are obtained. These control signals are inputted to a suspension control section 33, and the suspension control section 33 allows the suspension 3 to shift in the disk radial direction as well as in the disk thickness direction based upon the given tracking control signal and the focus control signal.

Figure 3:
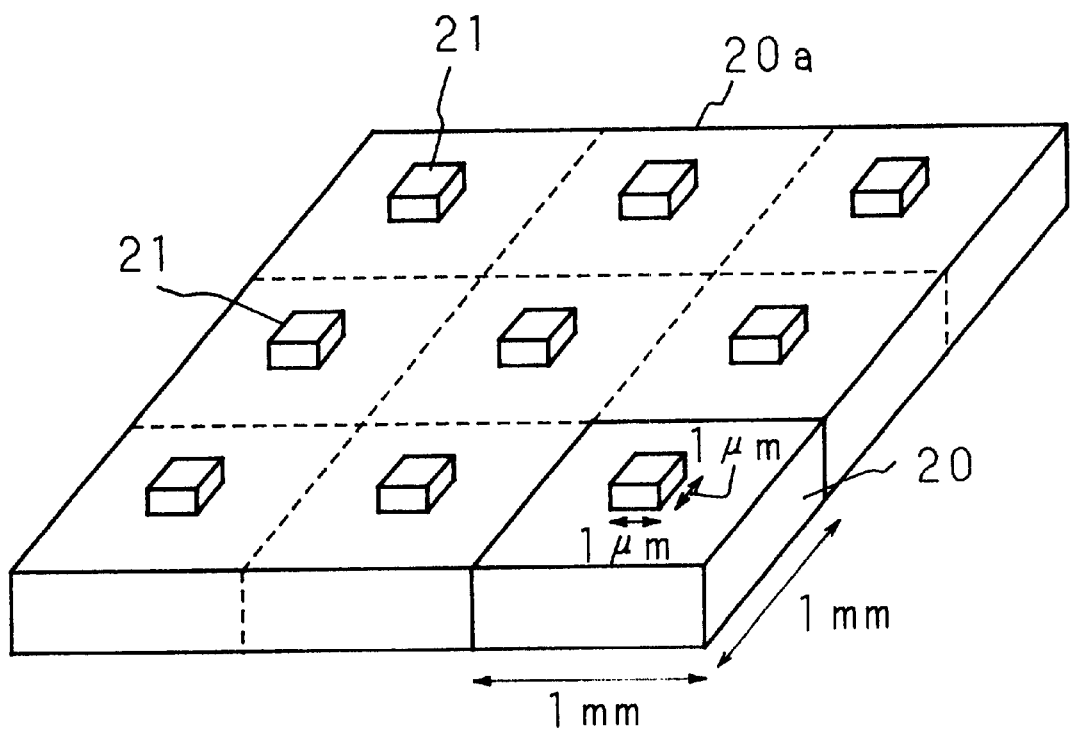
FIG. 3 is a perspective view that shows the manufacturing process of a reproducing head of embodiment 1.

With respect to the reproducing head 2 included in the reproducing apparatus constructed as described above, the following description will discuss the specific construction and manufacturing method thereof. FIG. 3 is a perspective view that shows the reproducing head 2 in the middle of its manufacturing process. In the manufacturing process of the reproducing head 2, first, a magnetic garnet film of $TbBi_2Fe_4GaO_{12}$ is grown up to a thickness of 1 $\mu$m by the LPE (Liquid Phase Epitaxy) method on a GGG base material 20a having a thickness of 0.5 mm. Next, the magnetic garnet film is coated with resist having a thickness of 100 nm, and this is subjected to a contact exposure. The pattern dimension is set at 1 $\mu$m×1 $\mu$m. After having been developed by normal developing liquid, this is immersed in hydrochloric acid for one minute so as to carry out etching. FIG. 3 shows the state after the etching. On the GGG base material 20a, reproducing chips 21, 21 . . . having a cubic shape each side having 1 $\mu$m, made of $TbBi_2Fe_4GaO_{12}$ are formed with predetermined pitches.

By cutting this GGG base material 20a at a dimension of 1 $\mu$m×1 $\mu$m, a reproducing head 2 having the GGG substrate 20 with the reproducing chip 21 formed thereon is manufactured. The magnetic garnet film of $TbBi_2Fe_4GaO_{12}$ has a coercive force of approximately 10 Oe, and has an easy axis of magnetization in a perpendicular direction to its film face. Moreover, $TbBi_2Fe_4GaO_{12}$ has such a characteristic that it forms a stripe magnetic domain width of 2 $\mu$m in its demagnetization state. Therefore, since the width dimension (dimension in the direction parallel to the film face) of the reproducing chip 21, with 1 $\mu$m×1 $\mu$m is smaller than the stripe magnetic domain width, a plurality of magnetic domains are not formed therein, with the result that a mono-magnetic domain structure is obtained.

As illustrated in FIG. 2, the magneto-optical disk 1 is provided with a recording film, in which a recording layer 12 of 20 nm made of $Tb_{22}Fe_{50}CO_{28}$ and a reproducing layer 13 of 10 nm made of $Gd_{23}Fe_{50}Co_{27}$ are exchange-coupled with each other, formed on a substrate 110. Here, the substrate 110 is a land/groove substrate having a track pith of 0.8 $\mu$m, with a groove depth of 20 nm . Moreover, the $Tb_{22}Fe_{50}CO_{28}$ film has an infinite coercive force at room temperature, and the $Gd_{23}Fe_{50}Co_{27}$ film has a coercive force of 200 Oe at room temperature, with a value of magnetization of 300 emu/cc. Here, each of these magnetic films is coated with a protective film of 20 nm made of SiN for protecting it from oxidation.

Figure 4:
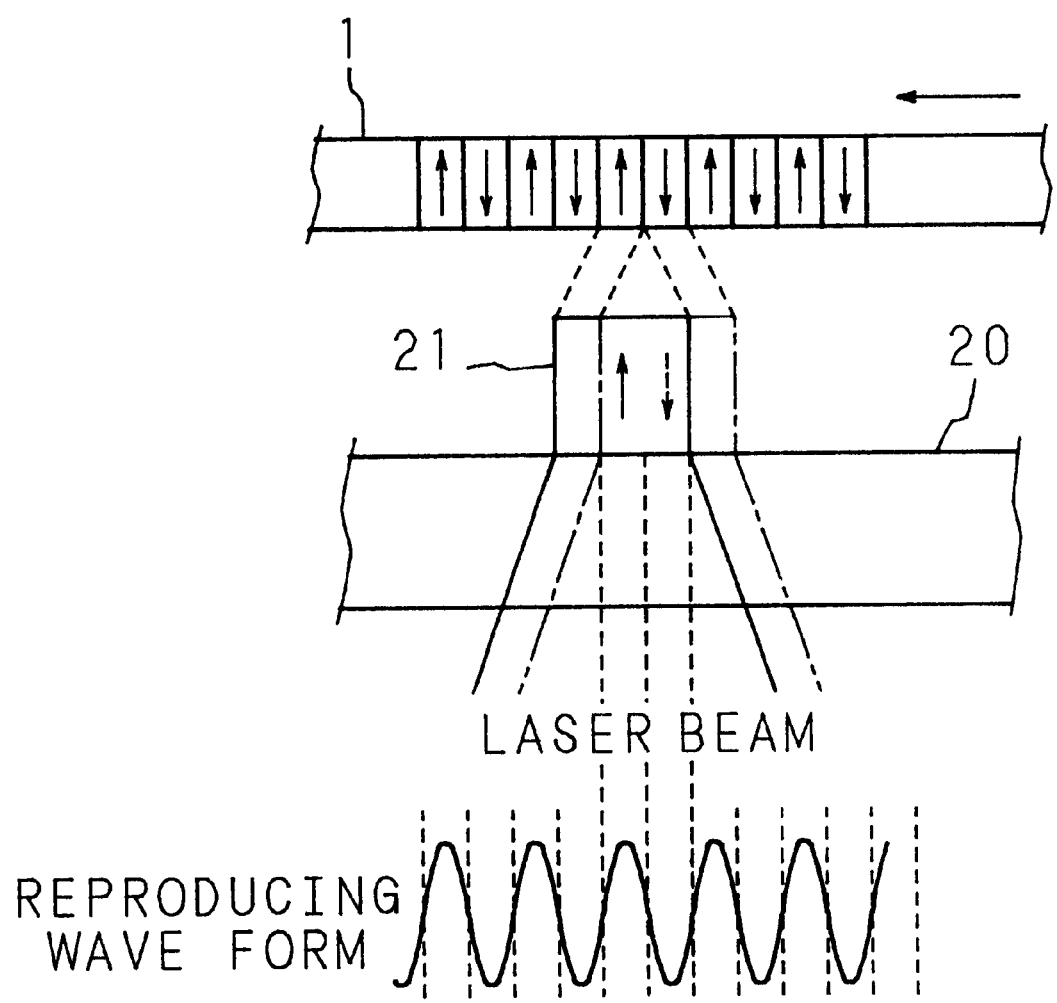
FIG. 4 is a drawing that shows a magnetization state and a reproducing waveform at the time of a reproducing process by the use of the reproducing head of embodiment 1.

On the magneto-optical disk 1, recording marks having different lengths are formed by the magneto-recording method with a high density, and the minimum recording mark has a dimension of approximately 0.1 $\mu$m. Upon reproducing information recorded on the magneto-optical disk 1 by using the reproducing apparatus shown in FIG. 2, the magneto-optical disk 1 is rotated, and the reproducing head 2 is shifted to a predetermined position above the magneto-optical disk 1. FIG. 4 is a drawing that shows a copied magnetization state and a reproducing waveform in the reproducing chip. In this Figure, arrows of the optical disk 1 and the reproducing chip 21 indicate the respective magnetization directions, and only the magnetization direction of the reproducing layer 13 is shown in the optical disk 1. The reproducing head 2 uses the GGG substrate 20 as a slider, and the reproducing chip 21 is disposed face to face with the magneto-optical disk 1 so that the easy axis of magnetization of the reproducing chip 21 is set substantially parallel to the thickness direction of the magneto-optical disk 1.

As illustrated in FIG. 4, the dimension of the reproducing chip 21 in the magnetic domain width direction is larger than the minimum mark length of the magneto-optical disk 1, and the reproducing chip 21 has the mono-magnetic domain structure; therefore, the recording mark of the magneto-optical disk 1 is copied onto the reproducing chip 21 in an enlarged manner. As illustrated in FIG. 4, the magneto-optical disk 1 forms a closed magnetic path by a leakage magnetic flux, with the result that the perpendicular component of the magnetic flux is copied onto the reproducing chip 21. An upward magnetic field is copied on the reproducing chip 21 indicated by a solid line, and as the magneto-optical disk 1 rotates, the next recording mark, that is, a downward magnetization, is copied, with the result that the reproducing chip 21 is subjected to a magnetization inversion as indicated by an alternate long and short dash chain line.

The reason that only one area of the magneto-optical disk 1 having a smaller dimension than the reproducing chip 21 is copied in this manner is supposedly because a temperature distribution takes place in the magneto-optical disk 1 upon irradiation by the laser beam so that only the recording marks located within a specific temperature area are copied. Moreover, the reproducing head 2 is slightly inclined with respect to the disk surface, and since the distance between the reproducing chip 21 and the magneto-optical disk 1 differs depending on positions, it is considered that only one area of the magneto-optical disk having a specific distance is copied.

Figure 5:
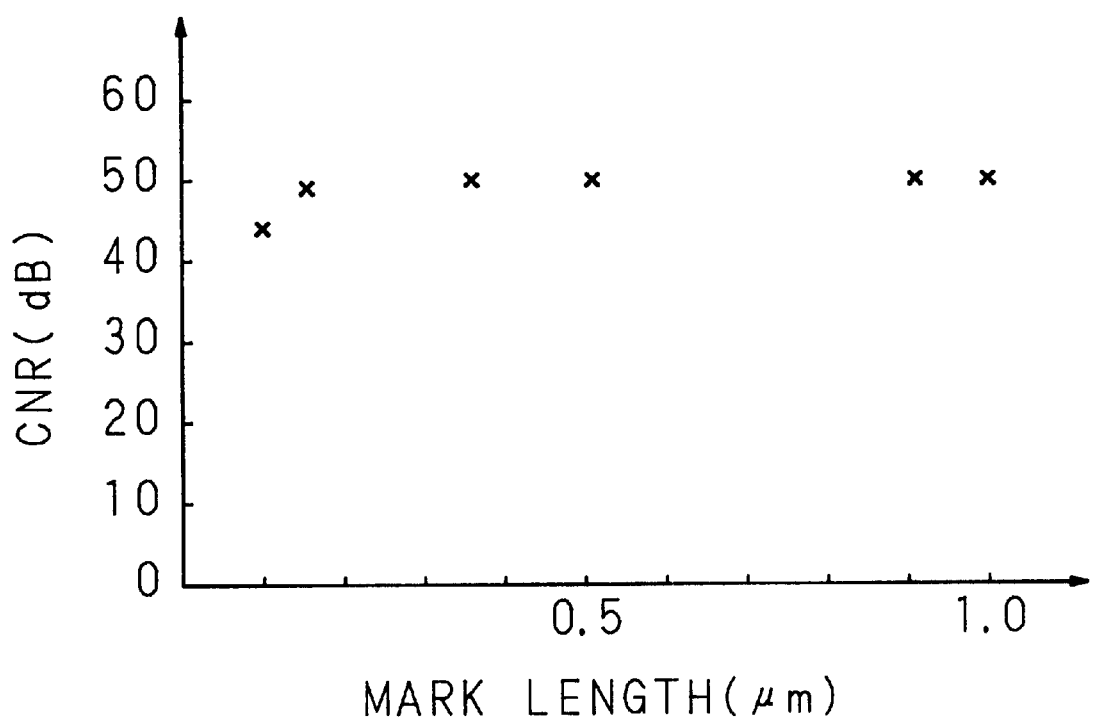
FIG. 5 is a graph that shows a reproducing characteristic of embodiment 1.

Information from the magneto-optical disk 1 thus copied on the reproducing chip 21 was reproduced, and the CNR of the reproduced signal with respect to the recording mark length was measured. FIG. 5 shows the results of the measurements in which the axis of ordinate represents the CNR, and the axis of abscissa represents the mark length. In this case, the height of floating of the reproducing head was set at 50 nm, and the reproducing power of the laser beam applied to the reproducing chip 21 was set at 1.5 mW. As indicated by the graph, the CNR was not less than 50 dB in the range of 1.0 $\mu$m to 0.15 $\mu$m of mark lengths, and the CNR decreased in the case of mark lengths smaller than 0.15 $\mu$m, with the CNR being substantiantially 45 dB in the case of 0.1 $\mu$m of mark lengths. Therefore, this shows that the short recording mark lengths of approximately 0.15 $\mu$m were copied on the mono-magnetic domain area of 1 $\mu$m of the reproducing chip 21, and then reproduced. In this manner, in embodiment 1, short recording marks are positively copied on the reproducing chip 21 having a high magneto-optical effect so that these can be reproduced with a sufficient CNR. Moreover, since reflected light from the reproducing chip 21 having a high magneto-optical effect is used so that the tracking control can be carried out with high precision.

Embodiment 2

In embodiment 1, the explanation has exemplified a case in which the reproducing chip 21 having a thickness of 1 $\mu$m is formed into a dimension of 1 $\mu$m×1 $\mu$m; and, in embodiment 2, a reproducing chip having a dimension of 0.5 $\mu$m×0.5 $\mu$m was formed, and its reproducing characteristic was observed. Except that the dimension of the reproducing chip 21 is different, the other construction is the same as that of embodiment 1; therefore, the description thereof is omitted.

In the same manner as embodiment 1, the CNR of the reproduced signal with respect to different recording mark lengths was measured, and 47 dB was obtained in the range of 1.0 $\mu$m to 0.08 $\mu$m of mark lengths. The reason that the CNR was low as a whole as compared with embodiment 1 was supposedly because the area of the laser-beam-irradiation face of the reproducing chip 21 was smaller than the area of the spot of the laser beam in embodiment 2. In contrast, the reason that the CNR was higher at smaller mark lengths as compared with embodiment 1 is supposedly because the smaller dimension of the reproducing chip 21 further reduced the influence of crosstalk and because the magnetization inversion of the reproducing chip 21 at the time of reproduction was quickly carried out.

Embodiment 3

Figure 6:
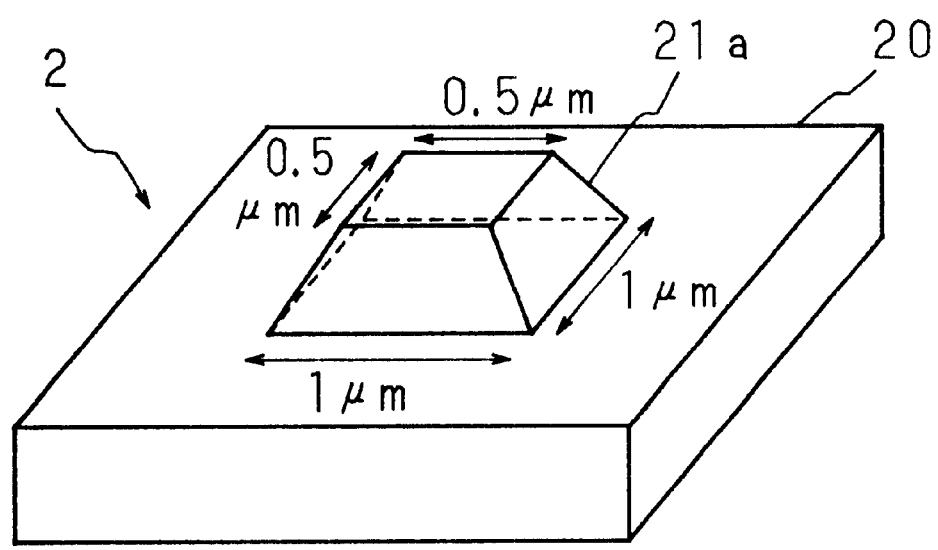
FIG. 6 is a perspective view that shows the construction of a reproducing head of embodiment 3.

Embodiments 1 and 2 have exemplified cases in which the reproducing chip 21 is formed into a rectangular parallelepiped shape; however, the present invention is not intended to be limited thereby. In embodiment 3, an explanation will be given of a reproducing chip having a shape that further improves the reproducing characteristic. FIG. 6 is a perspective view that shows the construction of a reproducing head 2 in accordance with embodiment 3. A reproducing chip 21a has a pyramid shape with a trapezoidal sectional view with a bottom face of 1 $\mu$m×1 $\mu$m and a top face of 0.5 $\mu$m×0.5 $\mu$m. In the case when the reproducing chip 21a with this shape is formed, the resist is exposed by using the same photomask as embodiment 1, and developed, and this is then subjected to an etching process by using diluted hydrochloric acid diluted to 30%. The magnetic garnet is formed into the pyramid shape by a side etching effect at the time of this etching process. Here, the other construction including the GGG substrate 20, etc. is the same as embodiment 1; therefore, the description thereof is omitted.

A magnetic flux was copied while the top surface having the smaller area was disposed face to face with the magneto-optical disk with the bottom face having the larger area being subjected to irradiation with a laser beam, and a change in the magneto-optical effect of the reproducing chip 21a was detected. By using this reproducing head 2, a magneto-optical disk on which recording marks having different lengths are formed was reproduced so that the CNR with respect to the mark lengths was measured. As a result, a CNR of 50 dB was obtained with respect to comparatively long mark lengths of approximately 1 $\mu$m, and that of 49 dB was also obtained with respect to short mark lengths of 0.08 $\mu$m. In this manner, by making the dimension of the irradiation face of the laser beam of the reproducing chip 21a wider than that of the receiving face of the magnetic flux from the magneto-optical disk 1, it becomes possible to increase the CNR to short recording marks, and consequently to improve the reproducing characteristic.

Embodiment 4

Figure 7:
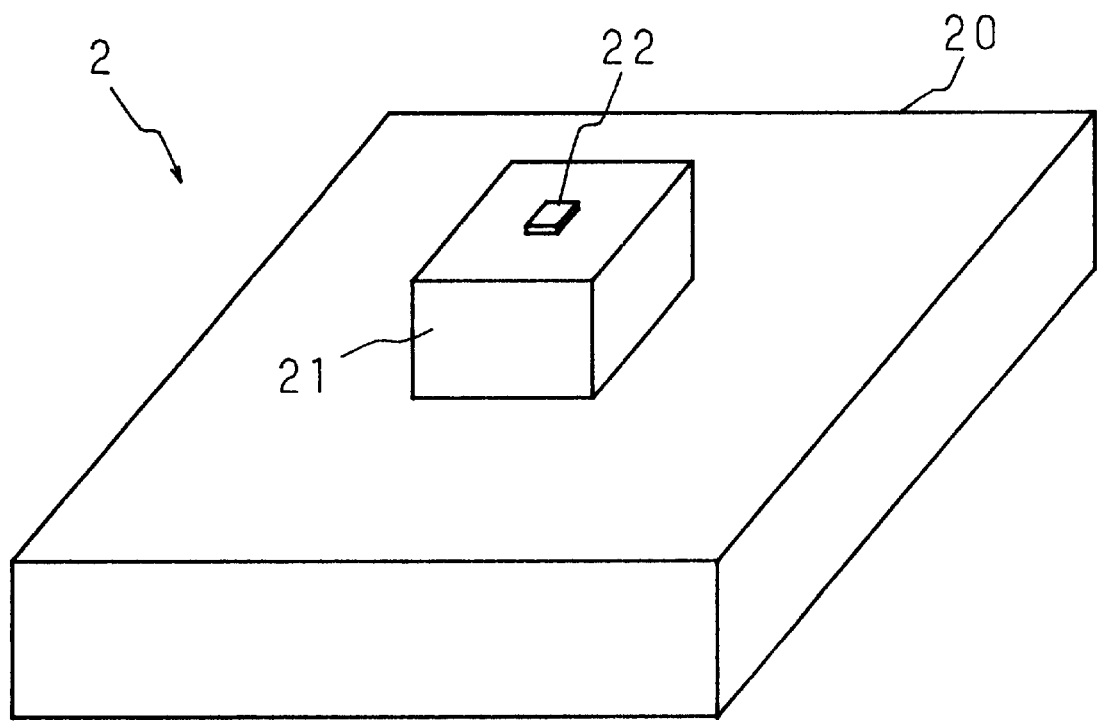
FIG. 7 is a perspective view that shows the construction of a reproducing head of embodiment 4.

Embodiment 3 has exemplified a case in which the reproducing chip is formed into a specific shape; next, embodiment 4 will discuss a reproducing head which can improve the reproducing characteristic by using a reproducing chip 21 having the same shape as embodiments 1 and 2. FIG. 7 is a perspective view that shows the construction of the reproducing head of embodiment 4. A reproducing chip 21 having a cubic shape with an upper face area of 1 $\mu$m×1 $\mu$m and a thickness of 1 $\mu$m is formed on a GGG substrate 20, and a soft magnetic film 22 made of NiFe is formed on the top face of the reproducing chip 21. The soft magnetic film 22 made of NiFe, which is a permeable magnetic film having a high permeability, is formed substantially in the center of the top face of the reproducing chip 21 with a dimension of 0.2 $\mu$m×0.2 $\mu$m.

Figure 8:
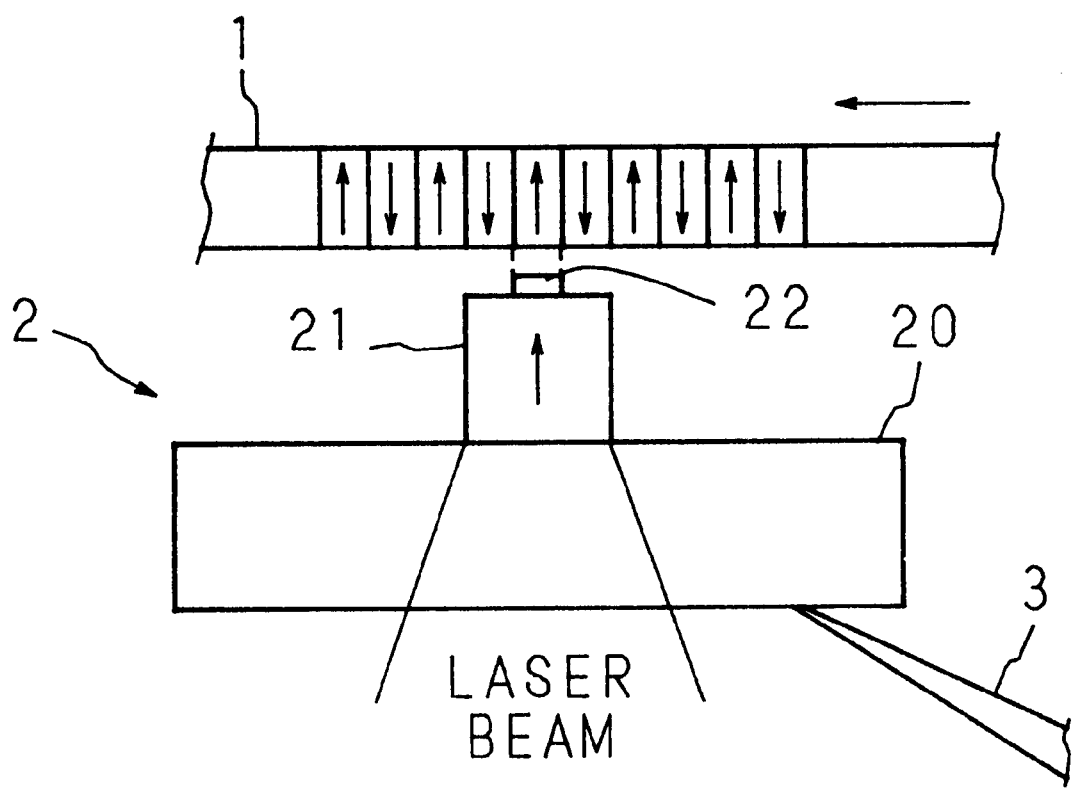
FIG. 8 is a drawing that shows the magnetization state at the time of reproducing by the use of the reproducing head of embodiment 4.

Upon forming the soft magnetic film 22, resist is applied to the reproducing chip 21, and after forming a pattern having a predetermined dimension thereon, this is exposed and developed. Next, a NiFe soft magnetic film 22 is formed thereon by a vacuum evaporation method using resistance heat, and this is lifted off. Here, the other construction of the reproducing head is the same as embodiment 1, and the description thereof is omitted. FIG. 8 is a drawing that shows a magnetization state in the case when the reproducing head having this construction is adopted. The reproducing head 2 is placed so as to align its soft magnetic film 22 face to face with the magneto-optical disk 1, and the suspension and the other construction of the reproducing apparatus are omitted. As illustrated in FIG. 8, the magnetic flux of an area of the magneto-optical disk 1 opposing the soft magnetic film 22 passes the soft magnetic film 22 and to be copied on the reproducing chip 21. In other words, the magnetic flux is first copied onto the soft magnetic film 22 having a smaller dimension than the reproducing chip 21 with high precision, and then copied onto the reproducing chip 21; therefore, it is possible to copy even short recording marks on the reproducing chip 21 with high precision.

By using this reproducing head 2, a magneto-optical disk on which recording marks having different lengths are formed was reproduced so that the CNR with respect to the mark lengths was measured. As a result, the measurements that were about the same as those of embodiment 3 were obtained. In other words, a CNR of 50 dB was obtained with respect to mark lengths of approximately 1 µm, and that of 49 dB was also obtained with respect to mark lengths of 0.08 µm. In this manner, by forming the soft magnetic film 22 on the reproducing chip 21, it becomes possible to increase the CNR to short recording marks, and consequently to improve the reproducing characteristic. Moreover, since the tracking control is carried out by using a magnetic flux copied on the small-size soft magnetic film 22 with high precision, it is possible to obtain a sufficient tracking performance.

Embodiment 5

Figure 9:
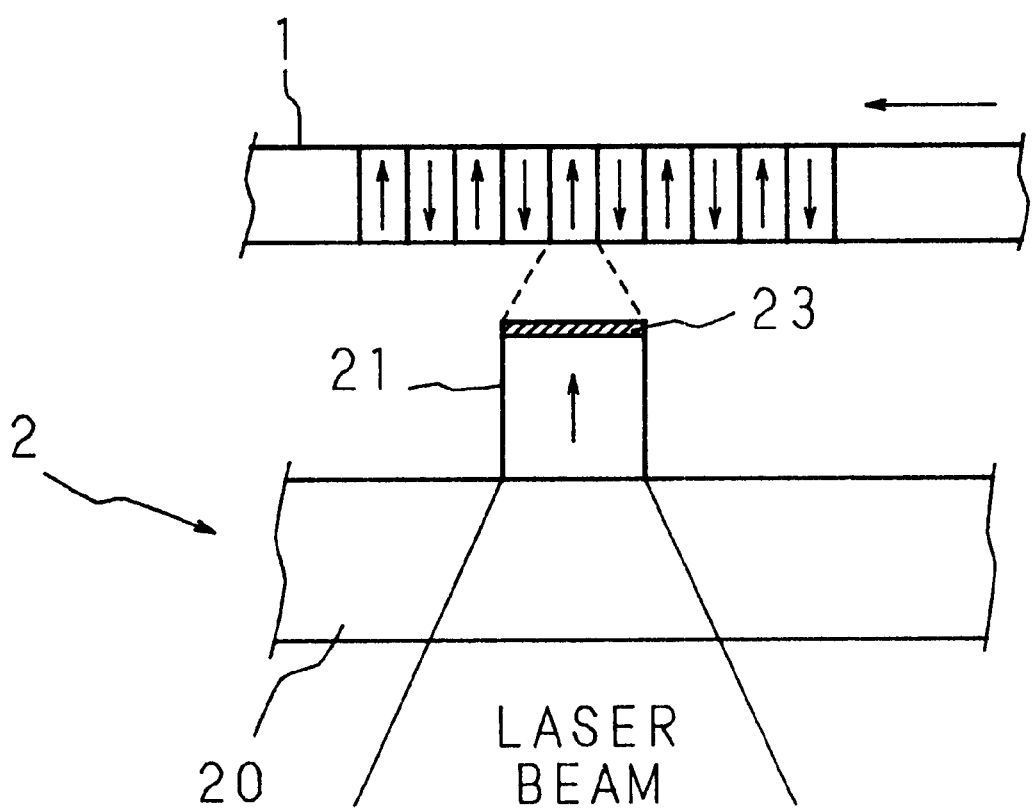
FIG. 9 is a drawing that shows the construction of a reproducing head of embodiment 5 and the magnetization state thereof on reproducing.

FIG. 9 is a drawing that shows the construction of a reproducing head and its magnetization state upon reproducing in accordance with embodiment 5. A reflection film 23 made of $Al_{90}Cr_{10}$ is formed on the top surface of a reproducing chip 21. The reflection film 23 is formed by a sputtering method with a thickness of 20 nm in a manner so as to cover the entire area of the top face of the reproducing chip 21. The other construction is the same as that of embodiment 1, and the description thereof is omitted. The laser beam, which has been made incident on the bottom face of the reproducing chip 21, is reflected by the reflection film 23 so that the amount of pass thereof toward the side of the magneto-optical disk 1 is reduced. Thus, it is possible to increase the amount of reflection of the laser beam on the reproducing chip 21, and consequently to increase the level of the reproduced signal.

By using this reproducing head 2, a magneto-optical disk on which recording marks having different lengths are formed was reproduced so that the CNR with respect to the mark lengths was measured. As a result, a CNR of not less than 52 dB with respect to the range of 1 µm to 0.15 µm of mark lengths was obtained. This CNR value is higher than that of embodiment 1. In this manner, by forming the reflection film 23 on the reproducing chip 21, the high CNR on the respective mark lengths is obtained, and the reproducing characteristic can be improved. Moreover, since the reflection film 23 has a film thickness of 20 nm , approximately 30% of light is passed toward the side of the magneto-optical disk 1. Thereby making it possible to provide a sufficient tracking performance.

Embodiment 6

The above-mentioned embodiments 1 through 5 have exemplified cases in which the reproducing chip, made of a magnetic oxide such as magnetic garnet, is formed on a GGG substrate; however, the present invention is not intended to be limited thereby. The reproducing chip may be formed on an $SiO_2$ substrate in place of the GGG substrate, the reproducing chip being formed with a thickness of 30 nm by a vacuum evaporation method by using a metal film such as Co. The reproducing chip had a reflection coefficient of approximately 50% and a permeability of approximately 20% with respect to the laser beam. Here, except that the materials of the reproducing chip and the substrate are different, the other construction is the same as that of embodiment 1; therefore, the description thereof is omitted.

By using this reproducing chip, a magneto-optical disk on which recording marks having different lengths are formed was reproduced so that the CNR with respect to the mark lengths was measured. As a result, a CNR of 50 dB was obtained at a mark length of 1 µm and a CNR of 49 dB was obtained at a mark length of 0.15 µm. Thus, it is found that the same reproducing characteristic is obtained in both of the cases when magnetic garnet is used in the reproducing chip and when Co is used therein.

Moreover, the reproducing characteristic was examined also in the case when the reproducing chip is formed by an alloy film such as GdFeCo. The $Gd_{21}Fe_{50}Co_{29}$ film was formed with a thickness of 30 nm, and an SiN film having a thickness of 10 nm is formed on each of the surfaces thereof so as to prevent oxidation. Furthermore, the $Gd_{21}Fe_{50}Co_{29}$ film is a TM rich (in which the transition metal is predominant in magnetization) film with a coercive force of 40 Oe. As a result of measurements on the reproducing characteristic using this reproducing chip, it is found that the same characteristic as the reproducing chip being made of Co is obtained.

Moreover, the formation of the reproducing chip by the use of a magnetic substance having Translucent property also makes it possible to obtain the about-mentioned same effect. For example, orthoferrite such as $YFeO_3$ is allowed to mono-crystal grow on a GGG substrate with a thickness of 1 µm so as to form a reproducing chip, and by using this, the reproducing characteristic was examined in the same manner as described above. As a result, it is found that although its CNR is low as compared with embodiment 1 since the magneto-optical effect of orthoferrite is smaller than that of magnetic garnet, shorter recording marks can be copied onto the reproducing chip of $YFeO_3$ and can be reproduced.

Embodiment 7

Figure 10:
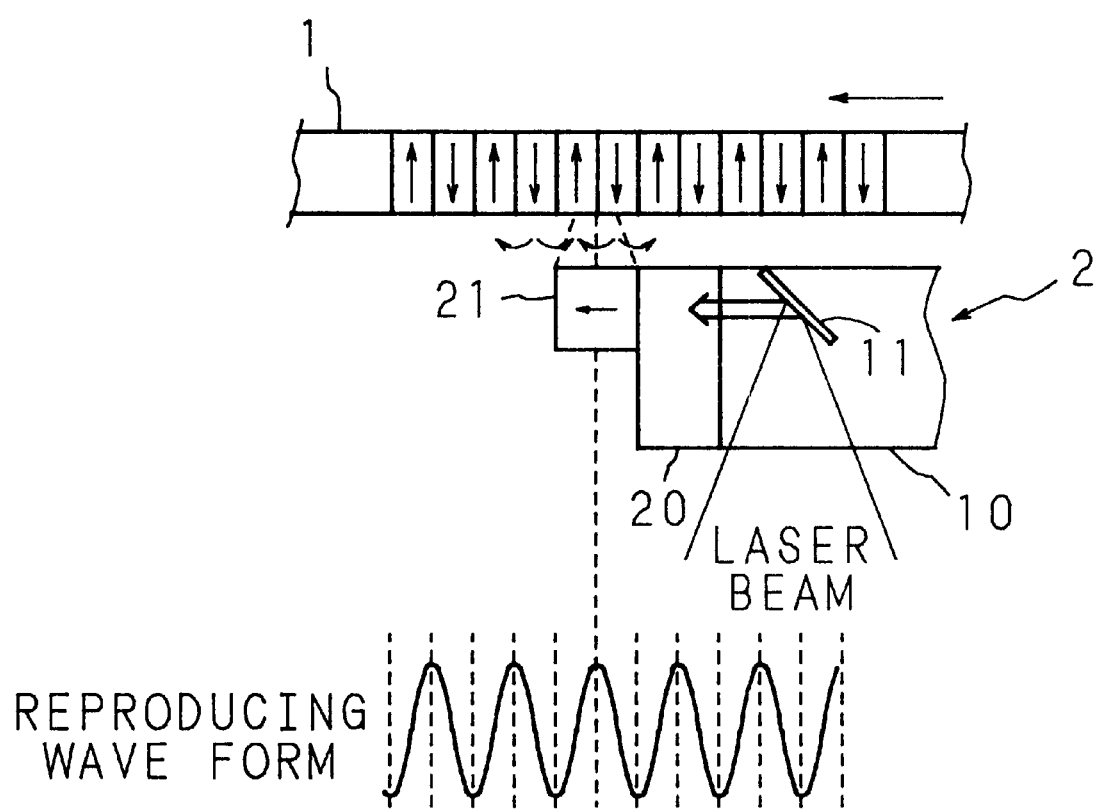
FIG. 10 is a drawing that shows the construction of a reproducing head of embodiment 7 and the magnetization state thereof in the case when a perpendicular magnetization medium is reproduced.

FIG. 10 is a drawing that shows the construction of a reproducing head in accordance with embodiment 7 and its magnetization state at the time of reproducing a perpendicular magnetization medium. The reproducing head 2 has an arrangement in which a one GGG substrate 20 and a reproducing chip 21 are attached to an end of a slider section 10 made of synthetic resin to which a reflection mirror 11 is incorporated, and when the magneto-optical disk 1 is rotated, the reproducing chip 21 is positioned on the rear side of the reproducing head 2 in the advancing direction. The reproducing chip 21, which is a magnetic garnet film of $TbBi_2Fe_4GaO_{12}$, is formed on an edge of the GGG substrate 20, and facing closer to the magneto-optical disk 1. Moreover, the reproducing chip 21 exhibits perpendicular magnetization, and is arranged with its easy axis of magnetization being aligned substantially perpendicular to the thickness direction of the magneto-optical disk 1. Furthermore, the reproducing chip 21 is also arranged with its magnetic domain width direction being the same as the thickness direction of the magneto-optical disk 1. The dimension of the reproducing chip 21 and the other construction are the same as those of embodiment 1; therefore, the description thereof is omitted.

As illustrated in FIG. 10, the magneto-optical disk 1 is a perpendicular magnetization medium provided with a recording film having an easy axis of magnetization in the thickness direction. A closed magnetic circuit of magnetic flux is formed by recording marks recorded on the magneto-optical disk 1. Upon reproducing, the magneto-optical disk 1 is rotated, and the side face (receiving face for magnetic flux) of the reproducing chip 21 along the thickness direction thereof is subjected to an in-plane component of the closed magnetic circuit, thereby the magnetic flux is copied to the reproducing chip 21. The reproducing-use laser beam is reflected on the reflection mirror 11, and directed on the base surface (border face to the GGG substrate 20) of the reproducing chip 21 through the GGG substrate 20. The laser beam is reflected on the reproducing chip 21, and the reflected light is received so that a change in the magneto-optical effect is detected. FIG. 10 shows the reproducing waveform of the reproduced signal obtained at this time. Only one area of the magneto-optical disk 1 is copied on the reproducing chip 21, and this area has a dimension smaller than 1 μm that is the thickness of the reproducing chip 21. As described earlier, this area is determined by the temperature distribution of the magneto-optical disk 1 caused by the irradiation of the laser beam as well as by the inclination of the reproducing head 2 to the disk face.

Figure 11:
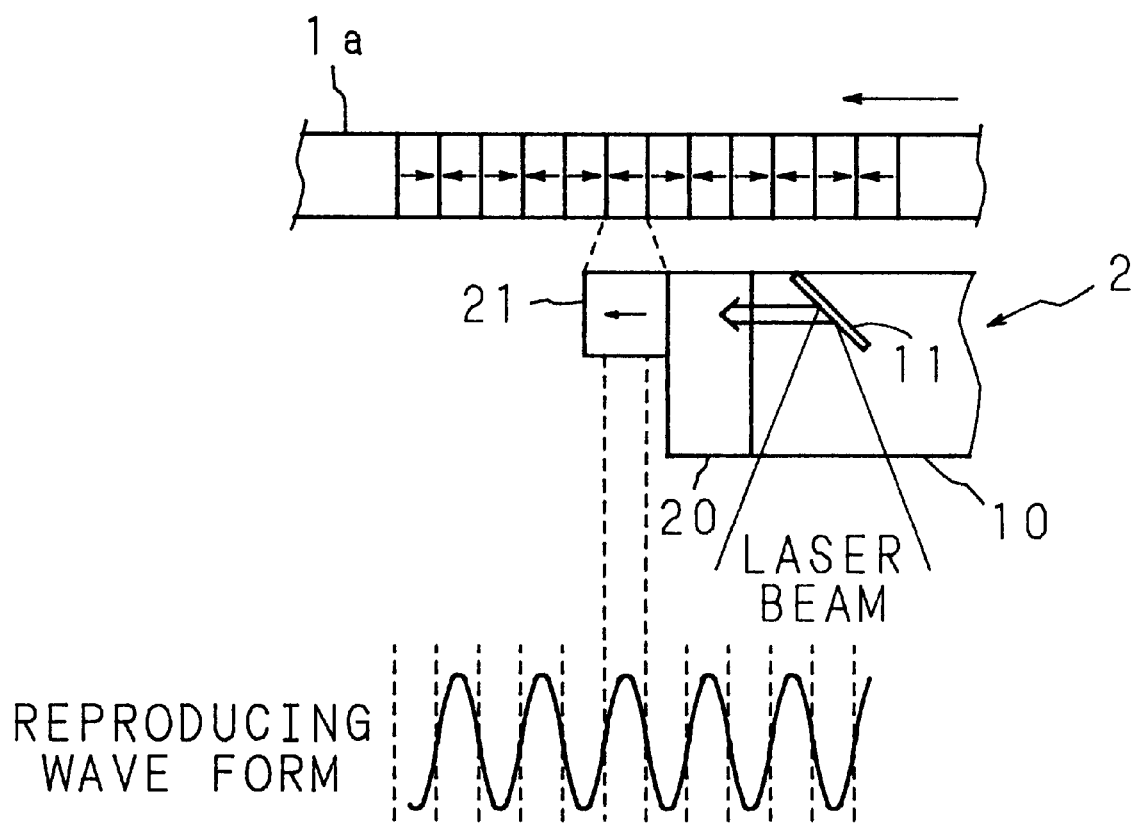
FIG. 11 is a drawing that shows the construction of a reproducing head of embodiment 7 and the magnetization state thereof in the case when an in-plane magnetization medium is reproduced.

FIG. 11 is a drawing that shows a magnetization state in the case when a reproducing head having the same construction as described above is used to reproduce an in-plane magnetization medium. The magneto-optical disk 1a is an in-plane magnetization medium provided with a recording film having an easy axis of magnetization in the in-plane direction thereof. A closed magnetic circuit of magnetic flux is formed by recording marks recorded on the magneto-optical disk 1a. Upon reproducing, the magneto-optical disk 1a is rotated, and the side face (receiving face for magnetic flux) of the reproducing chip 21 along the thickness direction thereof is subjected to an in-plane component of the closed magnetic circuit, with the result that the magnetic flux of one area of the magneto-optical disk 1a having a dimension smaller than 1 μm that is the thickness of the reproducing chip 21 is copied to the reproducing chip 21 one after another.

The results of measurements on the CNR upon reproduction shown in FIG. 10 and FIG. 11 indicate that both of the cases provide about the same CNR as that of embodiment 1. Therefore, in the case when the easy axis of magnetization of the reproducing chip 21 is aligned substantially perpendicular to the thickness direction of the magneto-optical disk, whether the recording film is a perpendicular magnetization film or an in-plane magnetization film, short recording marks can be reproduced with high precision, thereby making it possible to improve the reproducing characteristic. Here, in the reproducing chip 21, the dimension (thickness) of the receiving face for magnetic flux from the magneto-optical disk 1 is set smaller than the irradiation face for the laser beam. Therefore, in the same manner as embodiment 3, short recording marks can be copied with high precision. Moreover, as compared with the construction like embodiment 1 in which the reproducing chip 21 is arranged with its easy axis of magnetization being aligned substantially parallel to the thickness direction of the magneto-optical disk 1, embodiment 7 makes it possible to reduce the area required for the GGG substrate 20, and consequently to enhance the manufacturing efficiency of the reproducing chip 21.

Embodiment 8

Figure 12:
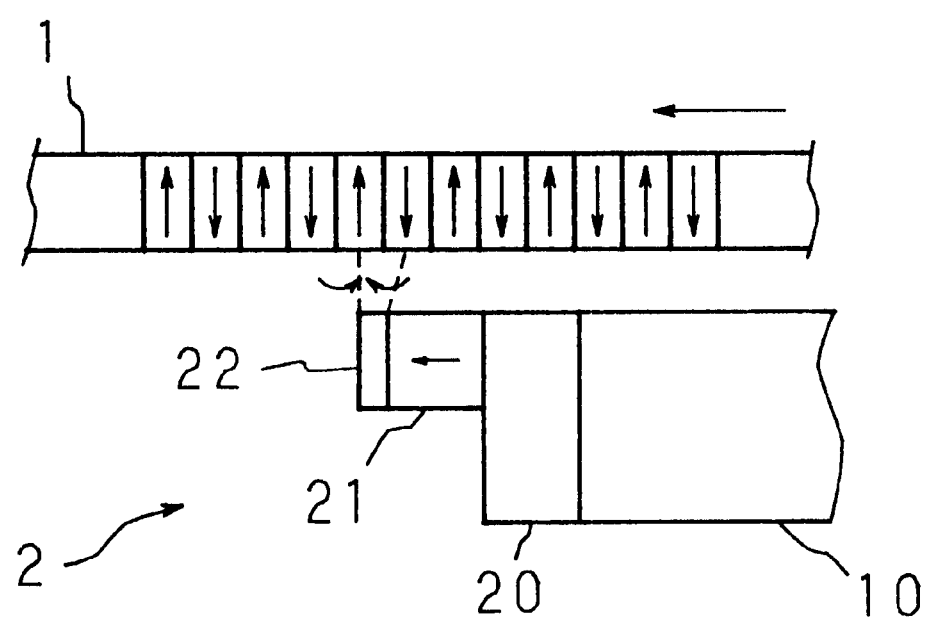
FIG. 12 is a drawing that shows the construction of a reproducing head of embodiment 8 and the magnetization state thereof on reproducing.

FIG. 12 is a drawing that shows the construction of a reproducing head in accordance with embodiment 8 and its magnetization state at the time of reproduction. A reproducing chip 21, which is a garnet magnetic film and has a rectangular parallelepiped shape, is formed on a GGG substrate 20 with a dimension of the base face of 1 μm×1 μm and a thickness of 1 μm, and a soft magnetic film 22 made of NiFe is formed on the face opposing the base face. The soft magnetic film 22 and its formation method are the same as those of embodiment 4; and the description thereof is omitted. Moreover, the other construction of the soft magnetic film 22 is the same as that of embodiment 7; and the description thereof is omitted.

The reproducing head 2 is placed face to face with the magneto-optical disk 1, and the suspension and the other construction of the reproducing apparatus are omitted from the drawing. The side face of the soft magnetic film 22 along the thickness direction thereof is facing to the magneto-optical disk 1, and the magnetic flux of an area of the magneto-optical disk 1 opposing the side face is copied on the reproducing chip 21 through the soft magnetic film 22. In the other words, the magnetic flux is first copied on the soft magnetic film 22 having a thickness dimension smaller than the thickness of the reproducing chip 21 with high precision, and the copied magnetic flex is then copied on the reproducing chip 21; therefore, even short recording marks can be copied on the reproducing chip 21 with high precision.

By using this reproducing head 2, a magneto-optical disk on which recording marks having different lengths were formed was reproduced, and the CNR with respect to the mark lengths was measured. Consequently, the results about the same as those of embodiment 4 were obtained.

Embodiment 9

Figure 13:
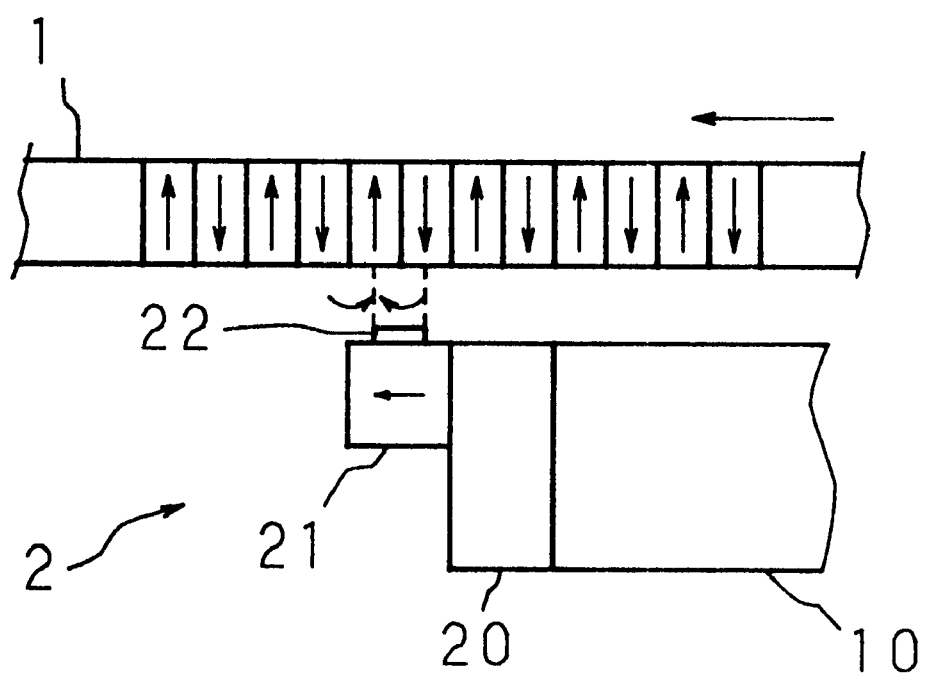
FIG. 13 is a drawing that shows the construction of a reproducing head of embodiment 9 and the magnetization state thereof on reproducing.

FIG. 13 is a drawing that shows the construction of a reproducing head in accordance with embodiment 9 and its magnetization state at the time of reproduction. A reproducing chip 21, which is made of a garnet magnetic and has a rectangular parallelepiped shape, is formed on a GGG substrate 20 with a dimension of the base face of 1 μm×1 μm and a thickness of 1 μm. A soft magnetic film 22 made of NiFe having a dimension of 0.2 μm×0.2 μm is formed on the side face of the reproducing chip 21 along the thickness direction thereof opposing the magneto-optical disk 1. The soft magnetic film 22 and its formation method are the same as those of embodiment 4; and the description thereof is omitted. Moreover, the other construction is the same as that of embodiment 7; and the description thereof is omitted.

The reproducing head 2 is facing to the magneto-optical disk 1, and the suspension, the reproducing apparatus and the other construction are omitted from the drawing. The magnetic flux of an area of the magneto-optical disk 1 opposing the soft magnetic film 22 is copied on the reproducing chip 21 through the soft magnetic film 22. In the other words, the magnetic flux of the magneto-optical disk 1 is first copied on the soft magnetic film 22 having a dimension smaller than the thickness of the reproducing chip 21 with high precision, and the copied magnetic flux is then copied on the reproducing chip 21; therefore, even short recording marks can be copied on the reproducing chip 21 with high precision.

By using this reproducing head 2, a magneto-optical disk on which recording marks having different lengths were formed was reproduced, and the CNR with respect to the mark lengths was measured. Consequently, the results about the same as those of embodiment 4 were obtained.

Embodiment 10

Figure 14:
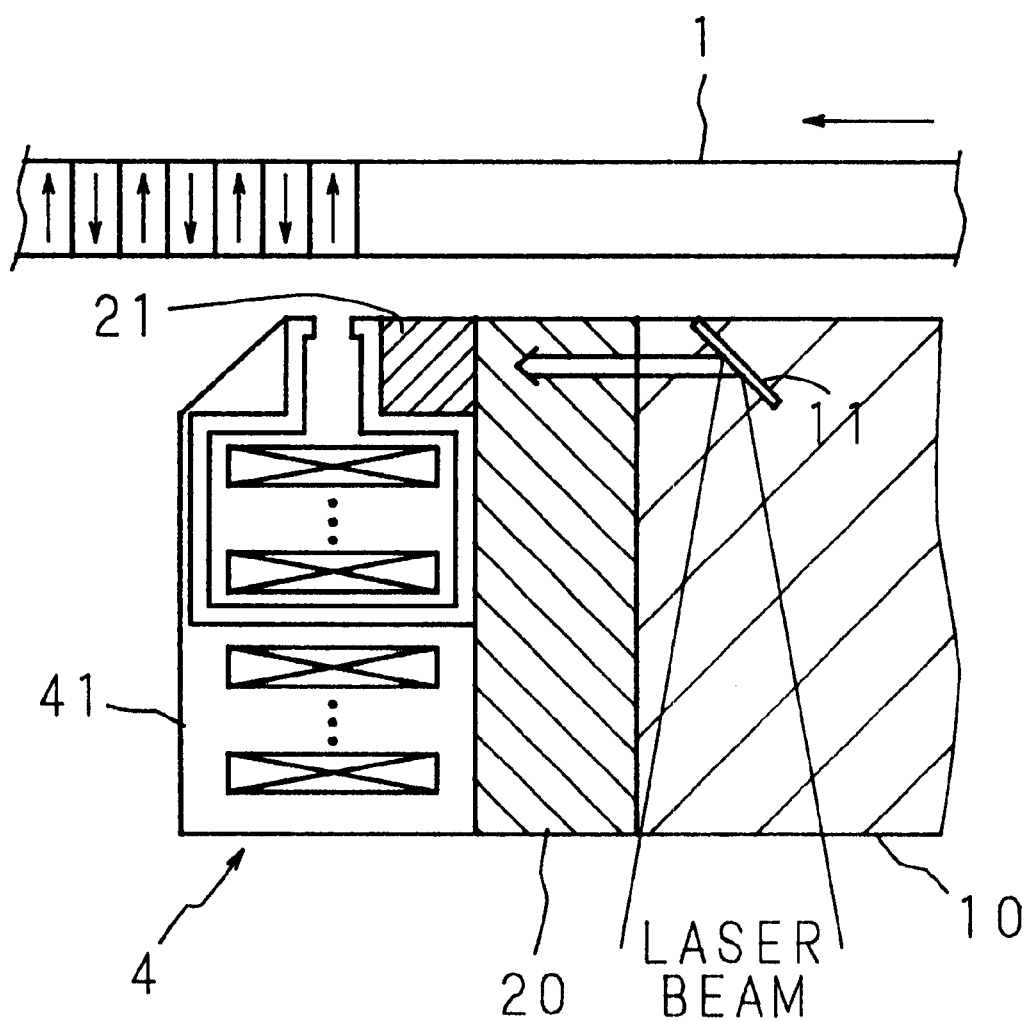
FIG. 14 is a drawing that shows the construction of a recording/reproducing head of embodiment 10 and the magnetization state thereof on recording.

FIG. 14 is a cross-sectional view that shows the construction of a recording/reproducing head in accordance with embodiment 10 and its state at the time of recording. The recording/reproducing head 4 is placed facing to the magneto-optical disk 1 at the time of recording/reproducing. The magneto-optical disk 1 is rotating. A thin-film recording head section 41 is provided with the rear side of the reproducing chip 21 in the advancing direction. In the case when information is recorded on the magneto-optical disk 1, in either of the cases when the recording is made by using the magnetic-field modulation recording system and when the recording is made by using the light modulation recording system, recording marks are formed on the rear side from the high-temperature area, that is, on the rear side from the reproducing chip 21. Here, the thin-film recording head section 41 is a known device used for a magnetic recording medium; and it is not intended to be limited by the construction shown in the drawing. Moreover, the other construction is the same as the reproducing head of embodiment 7; therefore, the description thereof is omitted.

When information is recorded on the magneto-optical disk 1 by using the recording/reproducing head 4 having the above-mentioned construction, the thin-film recording head section 41 applies a magnetic field to the magneto-optical disk 1, while the laser beam is reflected on the reflection mirror 11 and emitted to the reproducing chip 21. The magneto-optical disk 1 is heated when the reproducing chip 21 is irradiated so that information is thermo-magnetically recorded on the recording film of the magneto-optical disk 1. Moreover, as described above, at the time of reproducing, the laser beam is emitted to the reproducing chip 21 and its reflected light is received so that a change in the magneto-optical effect is detected. Here, not limited to thermo-magnetic recording, the recording/reproducing head 4 may carry out magnetic recording. Moreover, by installing the thin-film reproducing head section on a slider, it becomes possible to reproduce one portion or the entire portions of the information recorded by the thin-film recording head section, while the laser beam is irradiated thereto.

Embodiment 11

Figure 15:
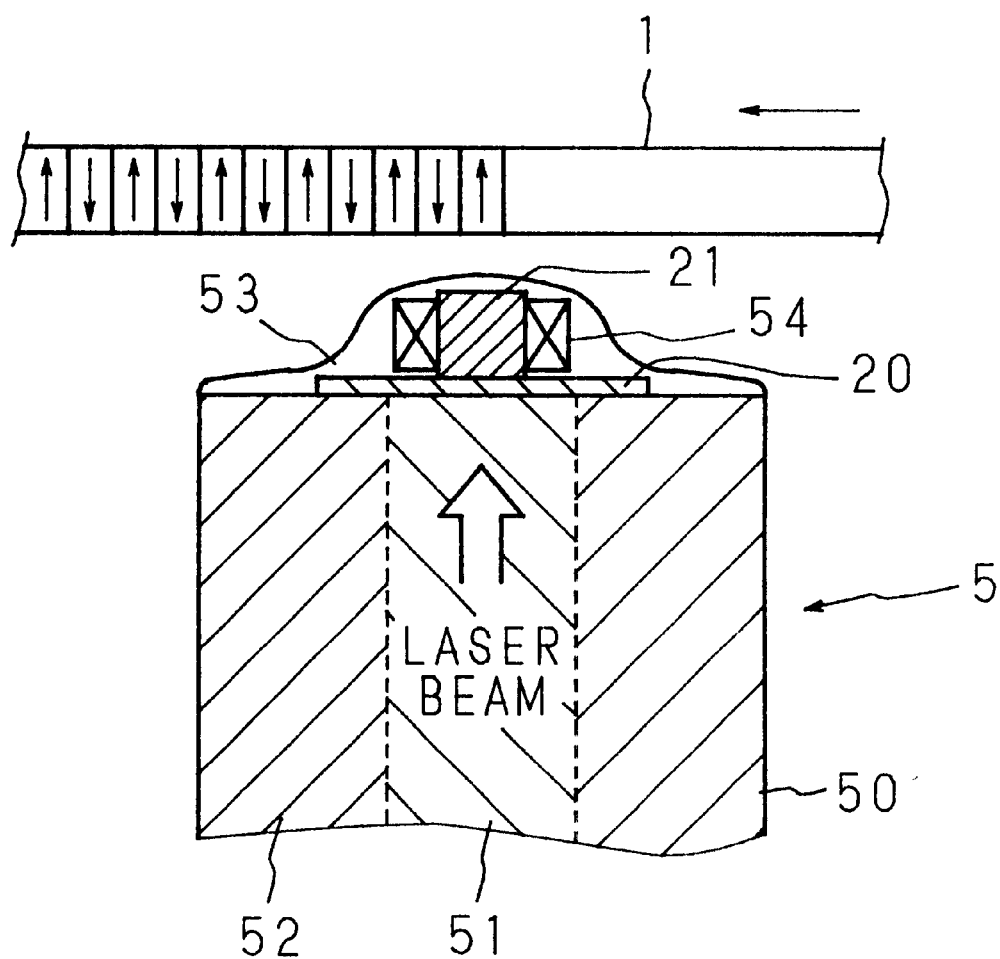
FIG. 15 is a drawing that shows the construction of a recording/reproducing head of embodiment 11 and the magnetization state thereof on recording.

FIG. 15 is a cross-sectional view that shows the construction of a recording/reproducing head in accordance with embodiment 11 and its state at the time of recording. An optical fiber 50, which has a line-shaped core section 51 coated with a clad section 52 on the periphery thereof, is provided with a tip section that is covered and sealed with an Al film 53. Within the Al film 53 of the optical fiber 50, a GGG substrate 20 and a reproducing chip 21 on the GGG substrate 20 are installed, and a coil section 54 is wound around the reproducing chip 21; thus, a recording/reproducing head 5 is constituted. In the case when information is recorded on a magneto-optical disk 1 by using the recording/reproducing head 5 having the above-mentioned construction, the tip of the optical fiber 50 is placed face to face with the magneto-optical disk 1, with the magneto-optical disk 1 being rotated. The coil section 54 applies a magnetic field to the magneto-optical disk 1, while a laser beam is transmitted through the inside of the optical fiber 50 and emitted to the reproducing chip 21. The magneto-optical disk 1 is heated when the reproducing chip 21 is irradiated so that information is thermo-magnetically recorded on the recording film of the magneto-optical disk 1. Moreover, upon reproducing, the laser beam is directed to the reproducing chip 21, and its reflected light is received by a photodiode (not shown) so that a change in the magneto-optical effect is detected.

Additionally, the recording/reproducing head 5 can carry out not only the thermo-magnetic recording, but also magnetic recording. Moreover, when the coil section 54 has been removed from the recording/reproducing head 5, it serves as a reproducing head that is capable of only reproducing.

As described above, in the above-mentioned embodiments 1 through 11, explanations were given of the case in which information, recorded on a magneto-optical disk 1 that thermo-magnetically records/reproduces information, is reproduced; however, the present invention is not intended to be limited thereby. For example, information, recorded on a magnetic disk that magnetically records/reproduces information, may be reproduced thermo-magnetically by using a magnetic-substance chip.

Moreover, the reproducing head 2 is not intended to be limited by the constructions explained in the above-mentioned embodiments; and the same effect can be obtained as long as the reproducing chip 21 has a mono-magnetic domain structure.

In embodiments 1 through 6 in which the perpendicular magnetization direction of the reproducing chip 21 is substantially in parallel with the thickness direction of the magneto-optical disk 1, the explanations were given of cases in which the magnetic domain width direction of the reproducing chip 21 is coincident with the circumferential direction of the magneto-optical disk 1; however, the present invention is not intended to be limited thereby, and the magnetic domain width direction may be coincident with the radial direction of the magneto-optical disk 1.

Furthermore, in embodiments 7 through 9 in which the perpendicular magnetization direction of the reproducing chip 21 is substantially perpendicular to the thickness direction of the magneto-optical disk 1, the explanations were given of cases in which the magnetic domain width direction of the reproducing chip 21 is coincident with the thickness direction of the magneto-optical disk 1; however, the present invention is not intended to be limited thereby, and the magnetic domain width direction may be coincident with the radial direction of the magneto-optical disk 1.

Moreover, in the above-mentioned embodiments, explanations were given of cases in which the magneto-optical disk 1 to be reproduced is provided with a recording layer 12 and a reproducing layer 13 as a recording film; however, the present invention is not intended to be limited by this film construction. Only the recording layer 12 may be used, or the recording layer 12 and another layer except the reproducing layer 13 may be used.

As described above, in the present invention, one area of recording marks recorded on an information recording film is copied on the entire area of a magnetic-substance chip having mono-magnetic domain structure in an enlarged manner so that the magnetization inversion of the magnetic-substance chip due to the copied magnetic flux is reproduced magneto-optically. Therefore, information that has been recorded on the information recording film with a high density can be accurately copied on the magnetic-substance chip so that a reproducing signal with a high level can be obtained. Moreover, by using a magnetic substance having a high magneto-optical effect as the magnetic-substance chip, it becomes possible to obtain a larger magneto-optical effect, and consequently to improve the reproducing characteristic; thus, the present invention has these and other effects.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information reproducing device for copying a magnetic flux from an information recording film to be reproduced, comprising a magnetic-substance chip which has mono-magnetic domain structure and has a surface facing to the information recording film.

2. The information reproducing device according to claim 1, wherein the magnetic-substance chip is being formed into a predetermined dimension by etching a magnetic substance that has been grown on a substrate.

3. The information reproducing device according to claim 1, wherein the magnetic-substance chip is made of a magnetic oxide having magnetic garnet structure containing a rare earth metal, a transition metal and oxygen ions.

4. The information reproducing device according to claim 1, wherein the magnetic-substance chip is a soft magnetic film having a perpendicular easy axis of magnetization.

5. The information reproducing device according to claim 1, wherein the magnetic-substance chip includes:
- a receiving face for receiving a magnetic flux from the information recording film; and
- an irradiation face for being irradiated with a light beam for reproducing the magnetic flux that has been copied.

6. The information reproducing device according to claim 5, wherein the irradiation face has a larger area than the receiving face of the magnetic flux in the magnetic-substance chip.

7. The information reproducing device according to claim 5, wherein a magnetization permeable film for allowing the magnetic flux to pass and to be copied onto the magnetic-substance chip is formed on the receiving face of the magnetic-substance chip.

8. The information reproducing device according to claim 5, wherein the magnetic-substance chip further comprises a reflection film for reflecting an irradiated light beam, being formed on the surface opposing the irradiation face.

9. An information reproducing head comprising:
- an information reproducing device for copying a magnetic flux from an information recording film to be reproduced, including a magnetic-substance chip that has mono-magnetic domain structure and has a surface facing to the information recording film; and
- a slider that has the information reproducing device attached thereto and is placed facing to an information recording medium having the information recording film.

10. The information reproducing head according to claim 9, wherein the magnetic-substance chip is attached to the slider with easy axis of magnetization of the magnetic-substance chip being aligned substantially in parallel with a thickness direction of the information recording film.

11. The information reproducing head according to claim 9, wherein the magnetic-substance chip is attached to the slider with easy axis of magnetization of the magnetic-substance chip being aligned crossing to a thickness direction of the information recording film.

12. An information reproducing head comprising:
- an information reproducing device for copying a magnetic flux from an information recording film to be reproduced, including a magnetic-substance chip that has mono-magnetic domain structure and has a surface facing to the information recording film; and
- an optical waveguide having a tip to which the information reproducing device is attached, with the tip being placed facing to an information recording medium having the information recording film.

13. The information reproducing head according to claim 12, wherein the magnetic-substance chip is attached to the optical waveguide with easy axis of magnetization of the magnetic-substance chip being aligned substantially in parallel with the thickness direction of the information recording film.

14. The information reproducing head according to claim 12, wherein the magnetic-substance chip is attached to the optical waveguide with its easy axis of magnetization of the magnetic-substance chip being aligned crossing to the thickness direction of the information recording film.

15. An information recording/reproducing head for recording/reproducing information from an information recording medium, having an information recording film, which has relatively moved, comprising:
- an information reproducing device for copying a magnetic flux from an information recording film to be reproduced, including a magnetic-substance chip that has mono-magnetic domain structure and has a surface facing to the information recording film;
- a slider that has the information reproducing device attached thereto and is placed facing to an information recording medium; and
- a magnetic head section for applying a magnetic field to the information recording medium, the magnetic head section being placed on the rear side in the shifting direction of the information reproducing device.

16. An information recording/reproducing head for recording/reproducing information from an information recording medium, having an information recording film, which has relatively moved, comprising:
- an information reproducing device for copying a magnetic flux from an information recording film to be reproduced, including a magnetic-substance chip that has mono-magnetic domain structure and has a surface facing to the information recording film;
- an optical waveguide having a tip to which the information reproducing device is attached, with the tip being placed facing to the information recording medium; and
- a coil section that is wound around the tip of the optical waveguide.

17. An information reproducing method for reproducing information from an information recording medium having an information recording film, comprising the steps of:
- placing a magnetic-substance chip having mono-magnetic domain structure so as to face the information recording film;
- copying a magnetic flux of a first area of the information recording film to the entire area of the magnetic-substance chip;
- moving the information recording medium with respect to the magnetic-substance chip, relatively;
- copying a magnetic flux in a second area adjacent to the first area of the information recording film to the entire area of the magnetic-substance chip; and
- irradiating the magnetic-substance chip with a light beam, so that a change in the magneto-optical effect of the magnetic substance chip is detected during the information recording medium relatively moves.

* * * * *